Nov. 11, 1941.                J. C. CARLIN                2,262,135
                         TIRE TRIMMING APPARATUS
                         Filed Sept. 11, 1940           2 Sheets-Sheet 2

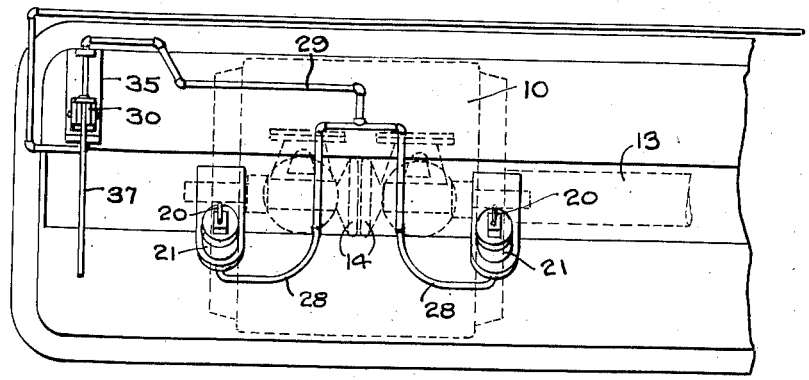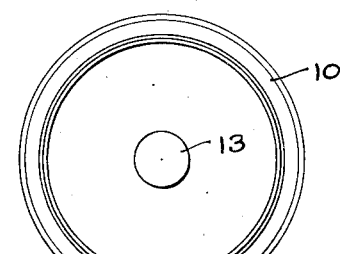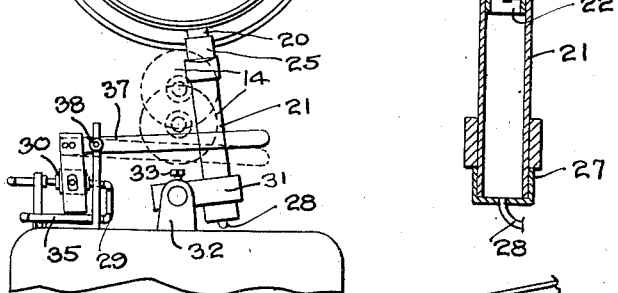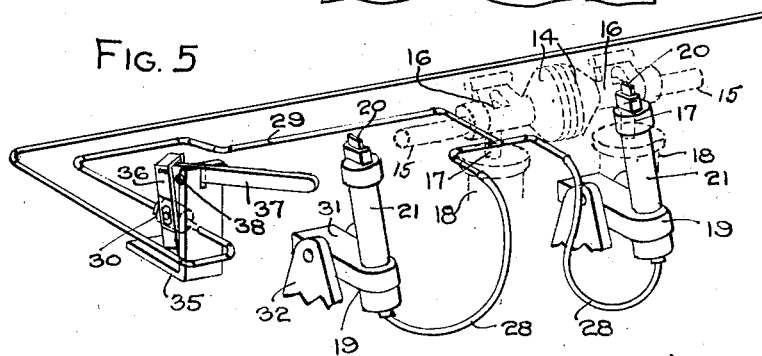

Inventor
JAMES C. CARLIN
By Leon Edelsen
    Attorney.

Patented Nov. 11, 1941

2,262,135

UNITED STATES PATENT OFFICE 2,262,135

TIRE TRIMMING APPARATUS

James C. Carlin, Norristown, Pa., assignor to Lee Rubber & Tire Corporation, Conshohocken, Pa., a corporation of New York Application September 11, 1940, Serial No. 356,305

12 Claims. (Cl. 154—10)

The present invention relates to a drum type of tire building apparatus which embodies a mechanism for rolling down and compacting the successive plies of fabric and the rubber tread member of the tire structure.

The present invention is particularly directed to an improvement on this type of tire building apparatus and has for its object to provide such an apparatus with automatically operative devices for trimming the superfluous edge portions of the rubber tread member.

Another object of the invention is to provide a trimming mechanism which will not injure the layers of fabric which are being built into the tire. A further object of the present invention is to provide a pneumatically operated trimming device which is brought into operation at the end of the operative stroke of the tire stitcher discs or wheels, which in the drum type of tire building apparatus operate upon the drum and the tire carcass to compact the successive plies of fabric and the rubber tread.

These and other objects of the present invention will be seen to be accomplished by the mechanism illustrated in the accompanying drawings and the following specification; it being understood, however, that these are merely illustrative of the present invention and do not serve as limitations thereon, variations of the specific structure shown herein falling within the scope of the appended claims being apparent to persons skilled in the art.

In the drawings:

Fig. 1 is a plan view of the tire building machine embodying the present invention, some of the parts of the machine being shown in dotted lines.

Fig. 2 is an end view of the machine.

Fig. 5 is a perspective view of the operative parts of the machine embodying the present invention.

Fig. 6 is a vertical sectional view of one of the cutters.

Figure 3:
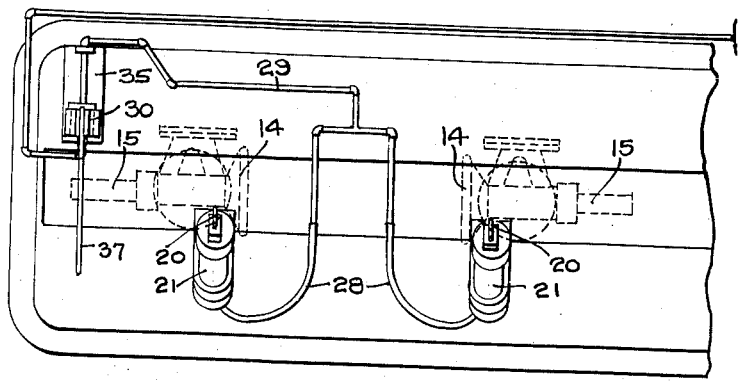
Fig. 3 is a plan view similar to Fig. 1 and showing the stitcher rolls at the end of their operative strokes.
Figure 4:
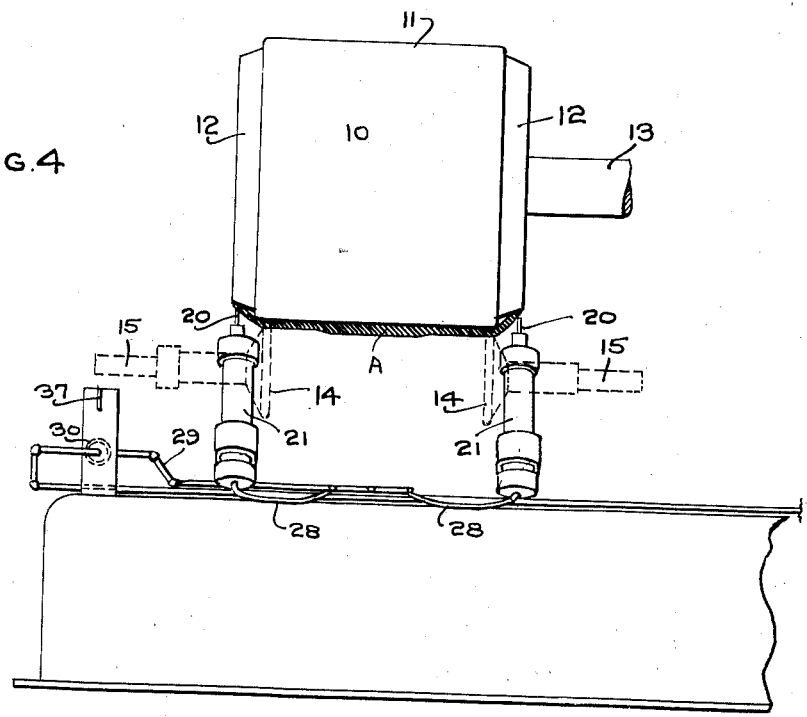
Fig. 4 is a vertical face view of the machine as shown in Fig. 3.

In the illustrated embodiment in the drawings the present invention is applied to the drum type of tire building apparatus in which the stitcher discs are each carried by a pair of stub shafts, which in operation are moved away from each other from the position shown in Figures 1 and 5 to the positions shown in Figures 3 and 4, these shafts and stitcher discs being pressed against the drum and tire carcass, so as to compact the fabric plies and rubber tread on the tire, the discs being rotated by the rotation of the drum. At the end of this operation the shafts and stitcher discs are moved downwardly and away from the drum and then back to the positions shown in Figures 1 and 5. It will be understood, however, that the present invention may be employed with other specific forms of tire building apparatus.

In a machine of this type the rotary drum 10 is collapsible and constitutes, when expanded, a tire form, such drum being commonly provided with a substantially cylindrical portion 11 and conical end portions or bead seats 12 of somewhat smaller diameter. This drum is suitably mounted on the outer end of a horizontal drive shaft 13, the power for driving the shaft not being shown in the present drawings. A pair of stitching discs 14 are each freely mounted on the ends of a pair of stub shafts 15, while collars 16 on these shafts are each carried by piston rods 17 which project upwardly from the fluid pressure cylinders 18, the latter being partially shown in dotted line in Figures 1, 3 and 5. The mechanism thus far described is more or less conventional, it being understood that the fluid pressure cylinders 18 shift laterally together with the stitching discs and act on the collar 16 in which the stitching disc shafts 15 are journalled to press the stitching discs into operative engagement with the tire band A shown in Figure 4.

In the operation of the tire building machine thus far described the various constituent parts of the tire such as the several plies of fabric and rubber tread composing the tire band A are assembled upon the drum or form 10 while the stitching rolls 14 are in a lower inoperative position shown in Figure 2, these stitching rolls being then adjacent each other as shown in Figures 1 and 5. When this operation has been completed and it is desired to apply the stitching discs 14 to the partly built tire upon the rotating drum or form 10, fluid pressure is applied to the cylinders 18 with the result that the stitching discs 14 are pressed upwardly to the upper position shown in Figure 2 and into engagement with the median portion of the tire carcass on the drum 10.

As the drum 10 rotates, the discs 14 each press against the band A on the drum and at the same time by means commonly known in the art and not thought necessary to be specifically disclosed and described in the present application these discs are moved laterally toward the marginal portions of the band and of the drum and thus exert the desired pressure over every portion of the tire carcass and serve to compact the rubber tread and the several plies of fabric into a unified and integrated band. At this point the discs 14 and shafts 15 occupy approximately the positions shown in Figures 3 and 4. While the operation of the discs smooths out all irregularities in the tire band, it tends somewhat to laterally stretch the outer rubber tread so that the opposite edges of the latter overlie the edges of the conical portions 12 to an extent somewhat greater than is actually desired.

In order to insure that the rubber tread is of the exact overall width desired and that the opposite edges thereof are truly parallel, the said edges of the rubber tread are trimmed by stripping or cutting away the outer rough edges of the rubber tread without harming the fabric plies. This is effected through the use of the mechanism of the present invention which includes a pair of laterally spaced pneumatically operable cutting devices 19, each of which is operated to press a rather dull friction blade 20 against the end portions of the tire band so as to cooperate with the rotating drum and remove the superfluous rubber from the tire band A. As clearly appears in the drawings, the devices 19 each comprise a fluid pressure cylinder 21, a piston 22 backed by a compression spring 23, and piston rod 24 carrying the holder 25 for the friction blade 20. Each of the cylinders 21 is preferably mounted in an arm 31 which is pivotally supported by the bracket 32 in any desired adjusted position by means of the set screw 33 (see Figure 2). This permits of angular adjustment of the cylinder 21 so as to obtain the most effective position for cooperating with different size drums of different types and thicknesses of tire carcasses.

The upper end of the cylinder 21 is preferably closed by a cap 26, while the lower end of the cylinder is closed by a cap 27 to which is connected the air pressure supply pipe 28. The two pipes 28 are commonly connected to a pipe 29 leading to a sleeve valve 30 of any suitable design and construction. Preferably, the valve 30 is carried by a fixed bracket 35, the movable sleeve portion of the valve being attached to a yoke or arbor 36. The upper end of this yoke 36 is in turn secured to the end of an operating rocker arm 37 which is fulcrumed, as at 38, to the vertical portion of the bracket 35.

Normally the operating arm 37 is in the upper full-line position shown in Figure 2 so that the valve 30 is closed, shutting off the air pressure from the cylinders 21 and also providing an exhaust vent for such cylinders. When, however, the stitching rolls 14 are in the position shown in Figures 3 and 4, namely, at the outer ends of their operative strokes and are dropped to the lower position shown in Figure 2, one of the shafts 15 will engage the arm 37 so as to move the same into the dotted line position shown in Figure 2, thereby opening the valve 30 to admit air pressure into cylinders 21 and closing off the exhaust vent. The friction blades 20 will thereby be moved upwardly against the pressure of the springs 23 and into engagement with the edge of the tire band on the drum 10. This engagement continues while the drum 10 makes several revolutions so that the friction between the blades 20 and the rubber generates heat, softening the rubber and permitting the dull blade to press and cut through the softened rubber down to the plies of fabric without injuring the fabric. The thus separated strip of rubber may subsequently be stripped or removed manually or in any other manner.

Before the thus formed and prepared tire carcass is removed from the drum, the operating arm 37 is moved manually to its upper position, thus operating the valve to shut off the air pressure from the cylinders 21 and permit venting of the air from the cylinders, the cutting blades 20 being then retracted into inoperative positions under the influence of the compression springs 23 acting on the piston rods 24. It will be understood that the mechanism is preferably so designed that the operating arm 37 for the valve 30 will remain indefinitely in its lowered position, even after the stitching disc shaft has been raised out of engagement therewith. Thus, fluid pressure may be continued to be supplied to the pressure cylinders to maintain the blades in contact with the tread even during the period that the stitching rolls are being returned to their initial position shown in Figures 1 and 2. Conversely, when the valve operating arm 37 is manually raised to thereby close the valve 30 and interrupt further supply of fluid pressure to the cylinders 21, said arm remains in said raised position until such time that the stitching discs 14 reach the outermost limits of their travel and then drop to cause one of the shafts 15 to engage and depress the valve operating arm.

It will be understood, of course, that the invention is susceptible of various changes and modifications from time to time without departing from the real spirit or general principles thereof and it is, accordingly, intended to claim the same broadly, as well as specifically, as indicated by the appended claims.

What is claimed as new and useful is:

1. A tire building apparatus comprising a rotatable drum for a flat band tire structure having an outer rubber tread and a pair of rotatable stitcher discs adapted to be moved toward and away from the drum; in combination with a mechanism for forming circumferential parallel grooves in the rubber tread immediately adjacent the opposite edges thereof in preparation for the removal of superfluous rubber, said mechanism comprising a unit disposed adjacent each end of the drum, each unit comprising a friction blade movable into yieldable engagement with the tire structure on the rotating drum, and means operable by the movement of said stitcher discs away from the drum to shift said units to their operative positions.

2. A tire building apparatus comprising a rotatable drum for a flat band tire structure having an outer rubber tread and a pair of rotatable stitcher discs adapted to be moved toward and away from the drum; in combination with a mechanism for forming circumferential parallel grooves in the rubber tread immediately adjacent the opposite edges thereof in preparation for the removal of superfluous rubber, said mechanism comprising a unit disposed adjacent each end of the drum, each unit comprising a friction blade movable into yieldable engagement with the tire structure on the rotating drum, fluid pressure responsive means for actuating said blade, and valve means operable by the movement of the stitcher discs away from the drum to admit fluid under pressure to said fluid pressure responsive means.

3. A tire building apparatus comprising a rotatable drum for a flat band tire structure having an outer rubber tread, and a pair of rotatable stitcher discs adapted to be moved jointly toward the median line of the drum, away from each other while being rotated by the drum to press against the tire structure and compact the same and then away from the drum when the stitcher discs have reached the ends of the drum; in combination with a mechanism for removing superfluous rubber from the tread at the opposite edges thereof, said mechanism having a normal position spaced from the drum and an operative position for frictional engagement with the tire structure on the rotating drum, and means operable by the movement of said stitcher discs away from the ends of the drum to move said mechanism to its operative position against the rotating drum and by frictional engagement with the rubber to soften the same and separate the superfluous rubber from the tire structure.

4. A tire building apparatus comprising a rotatable drum for a flat band tire structure having an outer rubber tread, and a pair of rotatable stitcher discs adapted to be moved jointly toward the median line of the drum, away from each other while being rotated by the drum to press against the tire structure and compact the same and then away from the drum when the stitcher discs have reached the ends of the drum; in combination with a mechanism for removing the superfluous rubber from the tread at the opposite edges thereof, said mechanism having a normal position spaced from the drum and an operative position for frictional engagement with the tire structure on the rotating drum, and means operable by the movement of said stitcher discs away from the ends of the drum to move said mechanism to its operative position against the rotating drum and by frictional engagement with the rubber to soften the same and separate the superfluous rubber from the tire structure, said mechanism comprising a friction blade for cutting a circumferential line into the rubber near each end of the drum.

5. A tire building apparatus comprising a rotatable drum for a flat band tire structure having an outer rubber tread, and a pair of rotatable stitcher discs adapted to be moved jointly toward the median line of the drum, away from each other while being rotated by the drum to press against the tire structure and compact the same and then away from the drum when the stitcher discs have reached the ends of the drum; in combination with a mechanism for trimming the superfluous rubber from the opposite edges of the tread, said mechanism having a normal position spaced from the drum and an operative position for frictional engagement with the tire structure on the rotating drum, said mechanism comprising air pressure responsive means for moving the same to operative position, and a valve controlling the admission of air pressure to said means and operable by the movement of said stitcher discs away from the ends of the drum to move said mechanism to its operative position against the rotating drum and by frictional engagement with the rubber to soften the same and separate the superfluous rubber from the tire structure.

6. A tire building apparatus comprising a rotatable drum for a flat band tire structure having an outer rubber tread, and a pair of rotatable stitcher discs adapted to be moved jointly toward the median line of the drum, away from each other while being rotated by the drum to press against the tire structure and compact the same and then away from the drum when the stitcher discs have reached the ends of the drum; in combination with a mechanism for trimming the superfluous rubber from the opposite edges of the tread, said mechanism having a normal position spaced from the drum and an operative position for frictional engagement with the tire structure on the rotating drum, said mechanism comprising a friction blade for cutting a circumferential line into the rubber near each end of the drum, air pressure responsive means for moving the mechanism to operative position and a valve controlling the admission of air pressure to said means and operable by the movement of said stitcher discs away from the ends of the drum to move said mechanism to its operative position against the rotating drum and by frictional engagement with the rubber to soften the same and separate the superfluous rubber from the tire structure.

7. A tire building apparatus comprising a rotatable drum for a flat band tire structure having an outer rubber tread, and a pair of rotatable stitcher discs adapted to be moved toward the median line of the drum, away from each other while being rotated by the drum to press against the tire structure and compact the same and then away from the drum when the stitcher discs have reached the ends of the drum; in combination with a mechanism for trimming superfluous rubber from the opposite edges of the tread, said mechanism comprising a cylinder and piston, a dull friction blade carried by the piston, a valve for admitting air pressure to said cylinder, and means operable by the movement of said stitcher discs away from the ends of the drum to open the valve to cause the admission of air pressure to said cylinder to move said piston and blade against the rotating drum and by frictional engagement with the rubber to soften the same and separate the superfluous rubber from the tire structure.

8. A tire building apparatus comprising a rotatable drum for a flat band tire structure having an outer rubber tread, a pair of rotatable stitcher discs adapted to be moved toward the median line of the drum, away from each other while being rotated by the drum to press against the tire structure and compact the same and then away from the drum when the stitcher discs have reached the ends of the drum, and a shaft carrying each disc; in combination with a mechanism for trimming superfluous rubber from the opposite edges of the tread, said mechanism comprising a cylinder and piston mounted near each end of said drum, a friction blade carried by each piston, a valve controlling the admission of air pressure to said cylinders, means interposed in the path of one of said shafts whereby the movement of said stitcher discs away from the ends of the drum opens the valve to cause the admission of air pressure to said cylinder to move said pistons and blades against the rotating drum and by frictional engagement with the rubber to soften the same and permit separation of the superfluous rubber from the tire structure, and a compression spring associated with each piston to return the same to normal position when the valve is moved to its normal position to close said valve and vent the air from said cylinder.

9. A tire building apparatus comprising a rotatable drum for a flat band tire structure having an outer rubber tread, a pair of rotatable stitcher discs adapted to be moved toward the median line of the drum, away from each other while being rotated by the drum to press against the tire structure and compact the same and then away from the drum when the stitcher discs have reached the ends of the drum, and a shaft carrying each disc; in combination with a mechanism for trimming superfluous rubber from the opposite edgs of the tread, said mechanism comprising a cylinder and piston mounted near each end of said drum, a dull friction blade carried by each piston, means for admitting air pressure to said cylinders, said means comprising a valve, an operating arm for said valve interposed in the path of one of said shafts, whereby the movement of said stitcher discs away from the ends of the drum moves the arm to open the valve to cause the admission of air pressure to said cylinder to move said pistons and blades against the rotating drum and by frictional engagement with the rubber soften the same and separate the superfluous rubber from the tire structure, and a compression spring associated with each piston to return the same to normal position when the said arm is moved to its normal position to close said valve and vent the air from said cylinder.

10. A tire building apparatus comprising a rotatable drum for a flat band tire structure having an outer rubber tread, a pair of rotatable stitcher discs adapted to be moved jointly upward toward the median line of the drum, away from each other while being rotated by the drum to press against the tire structure and compact the same and then jointly downward away from the drum when the stitcher discs have reached the ends of the drum, and a shaft carrying each disc; in combination with a mechanism for trimming superfluous rubber from the opposite edges of the tread, said mechanism comprising a cylinder and piston mounted near each end of said drum, a friction blade carried by each piston, means for controlling the air pressure in said cylinders, said means comprising a valve, having a normal position venting said cylinders to the atmosphere and an operating position closing said vent and admitting air pressure to said cylinders, an operating arm for said valve interposed in the downward path of one of said shafts, whereby the downward movement of said stitcher discs away from the ends of the drum operates the arm to move the valve to its operating position and causing the admission of air pressure to said cylinder to move said pistons and blades against the rotating drum and by frictional engagement with the rubber to soften the same and separate the superfluous rubber from the tire structure, and a compression spring associated with each piston to return the same to normal position when the said arm is moved to its normal position to close said valve and vent the air from said cylinder.

11. A tire building apparatus comprising a rotatable drum for a flat band tire structure having an outer rubber tread, and a pair of rotatable stitcher discs adapted to be moved jointly toward the median line of the drum, away from each other while being rotated by the drum to press against the tire structure and compact the same and then away from the drum when the stitcher discs have reached the ends of the drum; in combination with a mechanism for trimming superfluous rubber from the opposite edges of the tread, said mechanism having a normal position spaced from the drum and an operative position for engagement with the tire structure on the rotating drum, and means operable by the movement of said stitcher discs away from the ends of the drum to move said mechanism to its operative position against the rotating drum.

12. A tire building apparatus comprising a rotatable drum for a flat band tire structure having an outer rubber tread, and a pair of rotatable stitcher discs adapted to be moved jointly away from each other while being rotated by the drum to press against the tire structure and compact the same; in combination with a mechanism for trimming the superfluous rubber from the opposite edges of the tread, said mechanism including a pair of laterally spaced friction blades normally spaced from the drum and adapted for frictional engagement with the tire structure on the rotating drum, fluid pressure responsive means for moving said blades into said frictional engagement with the tire structure, and a valve controlling the admission of fluid under pressure to said means and operable, when the stitcher discs reach the outermost limits of their movement away from each other, to automatically project said blades into frictional engagement with the rubber tread to soften the same and separate the superfluous rubber from the tire structure.

JAMES C. CARLIN.